(12) United States Patent
Blumenfeld et al.

(10) Patent No.: US 8,786,519 B2
(45) Date of Patent: Jul. 22, 2014

(54) HEAD UP DISPLAY UTILIZING AN LCD AND A DIFFUSER

(75) Inventors: Yoel Blumenfeld, Rehovot (IL); Ofer Sinai, Rishon LeZion (IL); Shmuel Roth, Petah Tikva (IL); Guy Kaufman, Rehovot (IL)

(73) Assignee: Elbit Systems Ltd., Haifa (IL)

( * ) Notice: Subject to any disclaimer, the term of this patent is extended or adjusted under 35 U.S.C. 154(b) by 518 days.

(21) Appl. No.: 12/920,721

(22) PCT Filed: Mar. 2, 2009

(86) PCT No.: PCT/IL2009/000239
§ 371 (c)(1),
(2), (4) Date: Oct. 19, 2010

(87) PCT Pub. No.: WO2009/109965
PCT Pub. Date: Sep. 11, 2009

(65) Prior Publication Data
US 2011/0050548 A1 Mar. 3, 2011

Related U.S. Application Data

(60) Provisional application No. 61/033,696, filed on Mar. 4, 2008.

(51) Int. Cl.
*G09G 5/00* (2006.01)
*G02B 27/00* (2006.01)
*G02B 17/00* (2006.01)
*G02B 27/01* (2006.01)
*G02B 6/00* (2006.01)
*G02B 5/30* (2006.01)
*G02B 5/02* (2006.01)

(52) U.S. Cl.
CPC ...... *G02B 17/006* (2013.01); *G02B 2027/0125* (2013.01); *G02B 27/0101* (2013.01); *G02B 2027/015* (2013.01); *G02B 27/0081* (2013.01); *G02B 2027/0145* (2013.01); *G02B 6/00* (2013.01); *G02B 5/30* (2013.01); *G02B 5/02* (2013.01)
USPC .................................. 345/7; 345/8

(58) Field of Classification Search
USPC ......................................... 345/7–9
See application file for complete search history.

(56) References Cited

U.S. PATENT DOCUMENTS 3,915,548 A * 10/1975 Opittek et al. ................ 345/7
3,945,716 A * 3/1976 Kinder ........................... 345/7
(Continued)

FOREIGN PATENT DOCUMENTS

EP      0 566 002       10/1993
WO  WO 2006/085309      8/2006

OTHER PUBLICATIONS

International Search Report for PCT/IL2009/000239 (4 pages).

*Primary Examiner* — Christopher E Leiby
(74) *Attorney, Agent, or Firm* — Brown Rudnick LLP

(57) ABSTRACT

Head up display (HUD) for displaying a combined image of a scene image of a scene and an informative image, for an observer, the HUD including an image source, an optical relay, a low physical height horizontally expanding optical assembly and a planar optical module, the image source for producing a substantially small narrow angle informative image, the optical relay for producing a substantially large narrow angle informative image, by enlarging the substantially small narrow angle informative image, received from the image source, the low physical height horizontally expanding optical assembly for producing a horizontally expanded image, by horizontally expanding the substantially large narrow angle informative image, received from the optical relay, and the planar optical module for producing a substantially large informative image, by vertically expanding the horizontally expanded image, and further producing the combined image, by combining the substantially large informative image with the scene image.

17 Claims, 4 Drawing Sheets

(56) References Cited

U.S. PATENT DOCUMENTS

| | | | |
|---|---|---|---|
| 4,962,998 A * | 10/1990 | Iino | 359/630 |
| 5,034,732 A * | 7/1991 | Iino | 345/7 |
| 5,576,886 A * | 11/1996 | Ferrante | 359/630 |
| 6,609,795 B2 * | 8/2003 | Weber et al. | 353/20 |
| 7,482,996 B2 * | 1/2009 | Larson et al. | 345/7 |
| 8,031,406 B2 * | 10/2011 | Chen | 359/630 |
| 8,098,439 B2 * | 1/2012 | Amitai et al. | 359/630 |
| 8,159,752 B2 * | 4/2012 | Wertheim et al. | 359/632 |
| 2004/0066376 A1 * | 4/2004 | Donath et al. | 345/169 |
| 2004/0066547 A1 * | 4/2004 | Parker et al. | 359/15 |
| 2004/0108971 A1 * | 6/2004 | Waldern et al. | 345/8 |
| 2004/0109251 A1 * | 6/2004 | Freeman | 359/894 |
| 2005/0012682 A1 * | 1/2005 | Jenson et al. | 345/7 |
| 2005/0041297 A1 * | 2/2005 | He et al. | 359/631 |
| 2005/0206727 A1 * | 9/2005 | Kormos | 348/148 |
| 2007/0030174 A1 * | 2/2007 | Randazzo et al. | 340/979 |
| 2007/0041100 A1 | 2/2007 | Glickman | |
| 2007/0177110 A1 * | 8/2007 | Lowe | 353/78 |
| 2010/0060990 A1 * | 3/2010 | Wertheim et al. | 359/632 |

\* cited by examiner

HEAD UP DISPLAY UTILIZING AN LCD AND A DIFFUSER

FIELD OF THE DISCLOSED TECHNIQUE

The disclosed technique relates to optical devices in general, and to methods and systems for displaying an image from an LCD image source, in particular.

BACKGROUND OF THE DISCLOSED TECHNIQUE

Head up displays (HUD) are used to report a message to a user while the user continues to view an outside scene. For example, in an aircraft, the HUD displays important flight parameters to the pilot, on a combiner, without having the pilot to divert his view away from the ground or the aircraft flying nearby, toward the instrument panel or other locations within the cockpit. Methods and systems to construct a HUD are known in the art.

U.S. Pat. No. 7,095,562 B1 issued to Peng et al., and entitled "Advanced Compact Head Up Display", is directed to a head up display (HUD), utilizing a combiner in the form of a meniscus lens. The HUD includes a liquid crystal display (LCD) image source, and a meniscus combiner. The meniscus combiner includes a pair of meniscus lenses which are bonded together with a suitable cement. The layer between the lenses is used as a holographic mirror.

U.S. Pat. No. 7,068,444 B2 issued to Nishi, and entitled "Image Display Unit and Projection Optical System", is directed to an optical system for projecting an image on the retina of an eye of a user. The optical system includes an LCD module, a zoom automatic focus control system, a first, second, third and fourth reflection mirror, a relay lens, a diffusion glass, and an eyepiece lens. Light beams from the LCD are reflected by the first mirror, after passing through the zoom automatic focus control system, toward the second reflection mirror. The second reflection mirror reflects the light beams toward the relay lens, which expands the light beams, and transmits the light beams to the third reflection mirror. The third reflection mirror reflects the light beams toward the fourth reflection mirror, which in turn reflects the light beams toward the diffusion glass. The diffusion glass transmits the light beams toward the eyepiece lens, and the eyepiece lens projects the light beams on the retina of the user.

U.S. Pat. No. 6,947,013 B2 issued to D'Achard Van Enschut et al., and entitled "Display Device Combining Ambient Light with Magnified Virtual Images Generated in the Eye Path of the Observer", is directed to a display device for combining an image generated by an LCD, with the reality image, and displaying the combined image for an observer. The display device includes a light source, a semi-transmissive mirror, an LCD, a magnifying lens, a vertical polarization filter, a horizontal polarization filter, a shutter, and a diminishing lens.

The horizontal polarization filter is located between the light source and the semi-transmissive mirror. The LCD is located between the semi-transmissive mirror and the vertical polarization filter. The magnifying lens is located between the vertical polarization filter and an eye of the observer. The diminishing lens is located on a side of the semi-transmissive mirror, opposite to that of the LCD. The shutter is located between the diminishing lens and the reality image.

Horizontally polarized light is transmitted from the light source toward the semi-transmissive mirror, by the horizontal polarization filter. The horizontally polarized light is reflected by the semi-transmissive mirror toward the LCD, passes through the LCD and is vertically polarized by the vertical polarization filter. The magnifying lens magnifies the image represented by the vertically polarized light, and transmits it toward the eye of the observer. The light from the reality image passes through the shutter and the diminishing lens, toward the semi-transmissive mirror. The semi-transmissive mirror transmits the light from the diminishing lens toward the eye of the observer, thereby allowing the observer to observe the reality image combined with the image generated by the LCD. The diminishing lens compensates for the magnifying effect of the magnifying lens.

SUMMARY OF THE DISCLOSED TECHNIQUE

It is an object of the disclosed technique to provide a novel method and system for producing a substantially large informative image, from a substantially small original informative image, produced by a substantially small image source.

In accordance with the disclosed technique, there is thus provided a Head Up Display (HUD) for displaying a combined image of, a scene image of a scene, and an informative image, for an observer, the HUD including an image source for producing a substantially small narrow angle informative image, and an optical relay for producing a substantially large narrow angle informative image, by enlarging the substantially small narrow angle informative image, received from the image source. The HUD also includes a low physical height horizontally expanding optical assembly for producing a horizontally expanded image, by horizontally expanding the substantially large narrow angle informative image, received from the optical relay, and a planar optical module for producing a substantially large informative image, by vertically expanding the horizontally expanded image, and further producing the combined image, by combining said substantially large informative image, with the scene image.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by employing a low physical height horizontally expanding optical assembly, to horizontally expand a substantially wide angle informative image, and a planar optical module to vertically expand the horizontally expanded image, to produce a substantially large informative image, from a substantially small original informative image, produced by a substantially small image source. The planar optical module produces the substantially large informative image, within an enlarged eye motion box. Due to the substantially small height of the low physical height horizontally expanding optical assembly, a system of such a nature, can be placed in an enclosure, whose height is much smaller than its depth. This is essential in very constricted settings, such as the available space in a cockpit of an aircraft, above the pilot.

Since the horizontally expanding optical assembly expands an image only along the horizontal direction, its physical height is much less, and also its mass is much less than a conventional optical assembly, which is constructed to simultaneously expand the image both horizontally and vertically. Therefore, a system of such a nature weighs much less, and occupies much less space, than a conventional system, which is dedicated to produce a substantially large image, according to a substantially small image produced by an image source. This arrangement is beneficial for example, in case of a HUD, in which both weight and volume are critical.

Figure 1:
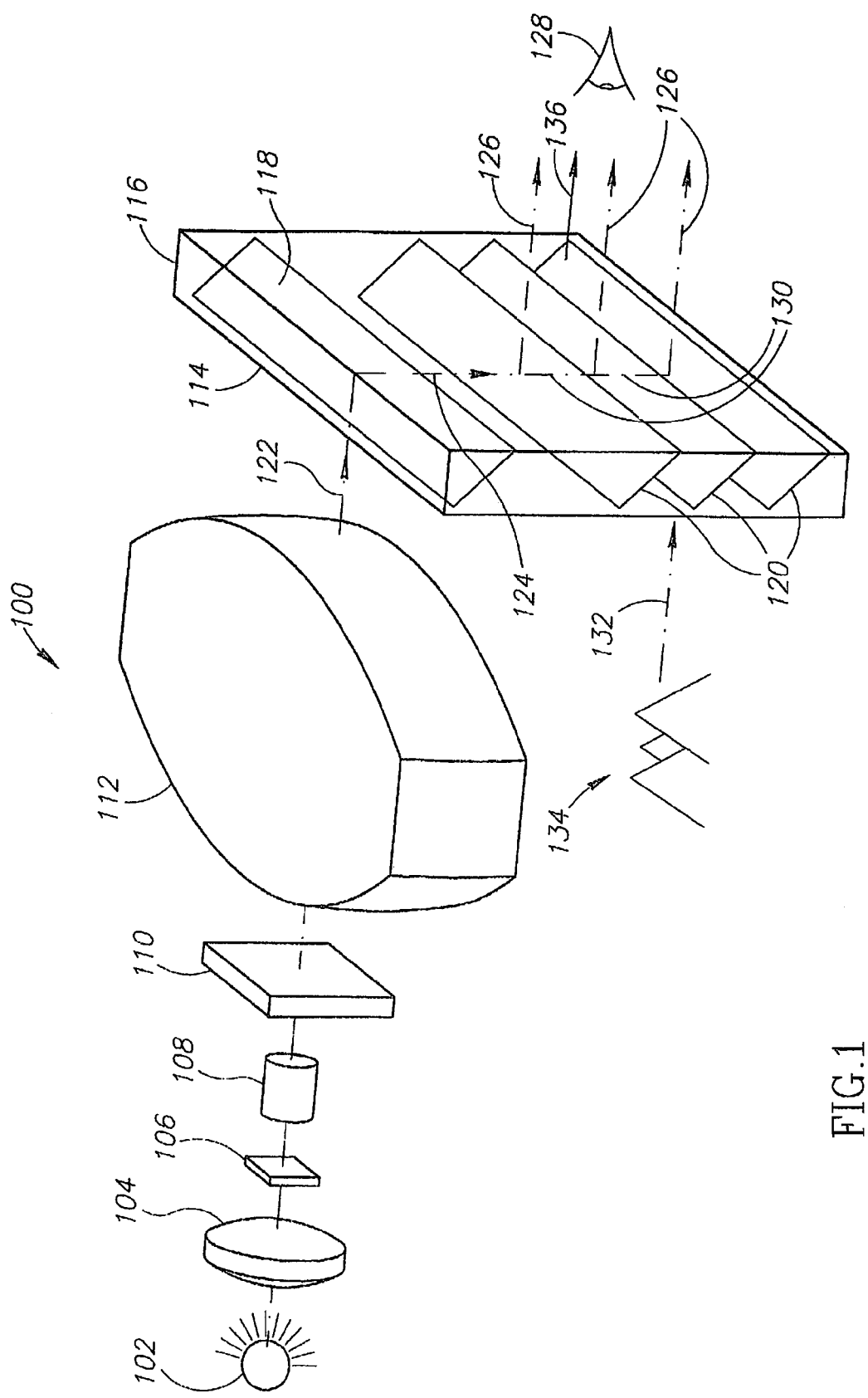
FIG. 1 is a schematic illustration in perspective, of a system for providing an observer an informative image along with a scene image of a scene, having an enlarged eye motion box, constructed and operative according to an embodiment of the disclosed technique, wherein the observer is located on a side of a planar light guide of the system, opposite to that of an image source of the system.
Figure 2:
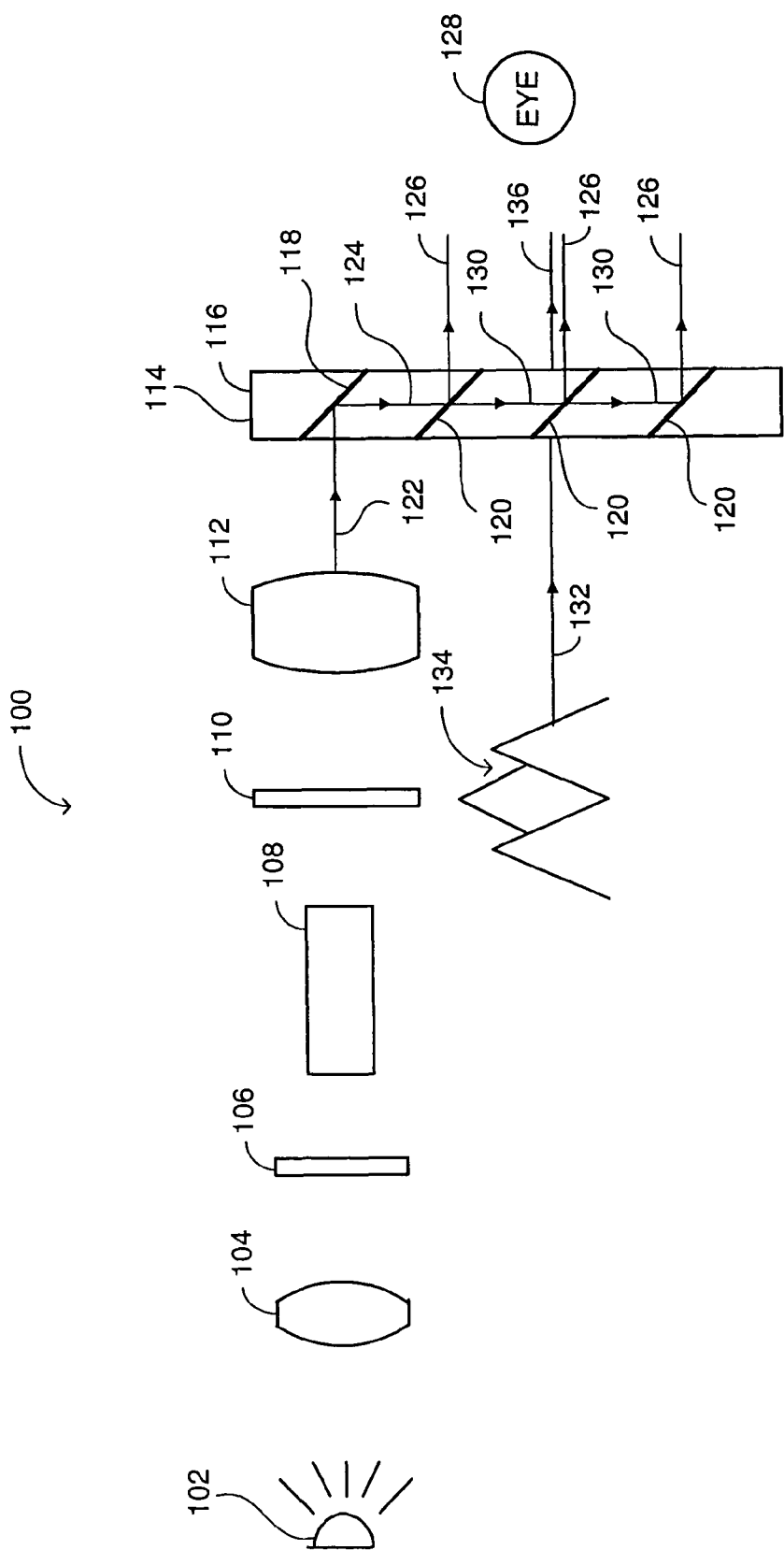
FIG. 2 is a schematic illustration of a block diagram of the system of FIG. 1.

Reference is now made to FIGS. 1 and 2. FIG. 1 is a schematic illustration in perspective, of a system generally referenced 100, for providing an observer, an informative image along with a scene image of a scene, having an enlarged eye motion box, constructed and operative according to an embodiment of the disclosed technique, wherein the observer is located on a side of a planar light guide of the system, opposite to that of an image source of the system. FIG. 2 is a schematic illustration of a block diagram of the system of FIG. 1.

System 100 includes a light source 102, backlight optics 104, an image source 106, an optical relay 108, a diffuser 110, a horizontally expanding optical assembly 112 (i.e., low physical height horizontally expanding optical assembly), and a planar optical module 114. Planar optical module 114 includes a planar light guide 116, a reflector 118, and a plurality of beam splitters 120. Backlight optics 104 is located between light source 102 and image source 106. Optical relay 108 is located between image source 106 and diffuser 110. Horizontally expanding optical assembly 112 is located between diffuser 110 and planar optical module 114.

Light source 102 can be a point-like source of light, such as a light emitting diode (LED), laser, and the like. Light source 102 is a light source having a substantially small physical size, which dissipates a substantially small amount of heat to the surrounding, desirable to be employed for example, in a cockpit setting (not shown) of an aircraft (not shown). Backlight optics 104 is an optical device which homogenizes the light emitted by light source 102, and produces a uniform light. Backlight optics 104 is an optical device, for example, in the form of a fiber optic light guide, a light guide filled with a light transmitting fluid, fly eyes homogenizer, a set of one or more lenses, and the like.

Image source 106 can be in the form of a two-dimensional LCD whose surface area is substantially small (e.g., 1.5" or less in diagonal), thereby saving space, power consumption, and reducing heat dissipation. Image source 106 can be for example, in the form of a cathode ray tube (CRT), digital matrix display micromirror device (DMD), liquid crystal on silicon (LCOS), and the like. Optical relay 108 includes a plurality of optical elements, such as lenses and prisms (not shown), in order to enlarge an image, whose light beams are essentially collimated. Diffuser 110 is a device which diffuses the incoming light, thereby producing a wide angle image. Horizontally expanding optical assembly 112 can be for example, in the form of a portion of an equiconvex lens, which expands an image only horizontally.

Image source 106 produces an informative image, for example in case of an aircraft, the air speed and the altitude of the aircraft. The informative image is a substantially narrow angle small image, and essentially collimated. In order to be eventually perceptible by the observer, this substantially narrow angle small informative image has to be sufficiently enlarged, and diffused to a wide angle image. Light source 102 together with backlight optics 104 illuminate the substantially narrow angle small informative image, produced by image source 106.

Horizontally expanding optical assembly 112 horizontally expands an enlarged wide angle image produced by diffuser 110, and directs a light beam 122 toward planar optical module 114. Reflector 118 is oriented at an angle relative to the direction of light beam 122, arriving from horizontally expanding optical assembly 112, such that reflector 118 directs a reflected light beam 124 of light beam 122, within planar light guide 116. Each of beam splitters 120 is oriented at an angle relative to the direction of light beam 122, such that it directs a portion of reflected light beam 124, as a reflected light beam 126, away from image source 106, and toward an eye 128 of an observer (not shown), located on an opposite side of image source 106. Each of beam splitters 120 further directs another portion of reflected light beam 124, as a light beam 130 toward the consecutive beam splitter. In this manner planar optical module 114 vertically expands light beam 122, thereby producing a substantially large wide angle image, of a substantially narrow angle small image, produced by image source 106.

Planar optical module 114 can operate also as a combiner. A light beam 132 representing a scene image of a scene 134, located on the same side of system 100 at which image source 106 is located, arrives at planar optical module 114. Planar optical module 114 produces a combined light beam 136, by combining light beam 132 with light beam 126, and eye 128 can observe the image produced by image source 106, along with scene 134. It is noted that image source 106 can produce an informative image.

Figure 3:
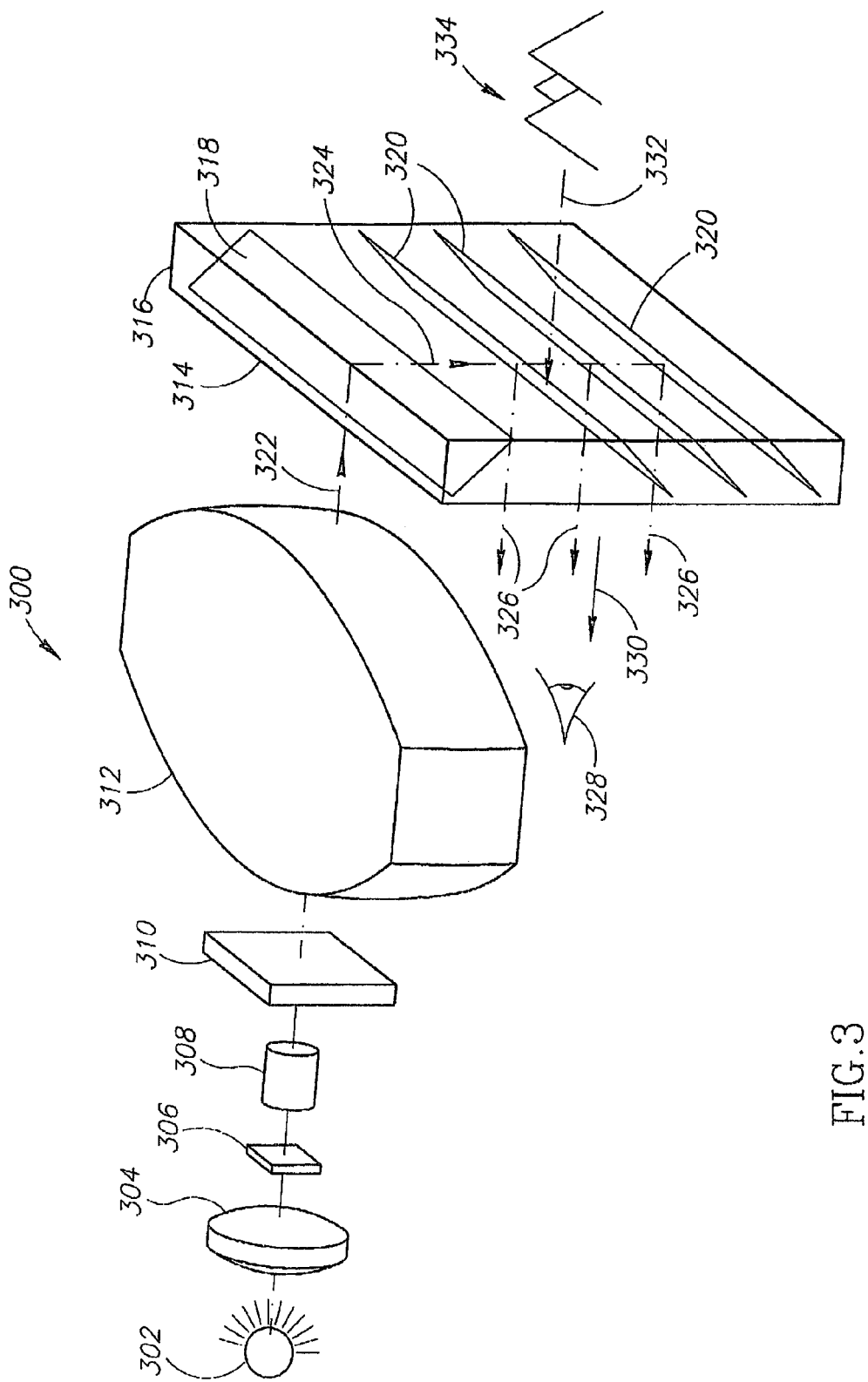
FIG. 3 is a schematic illustration in perspective, of a system for providing an observer an informative image along with a scene image of a scene, having an enlarged eye motion box, constructed and operative according to another embodiment of the disclosed technique, wherein the observer is located on the same side of a planar light guide of the system where an image source of the system is located.
Figure 4:
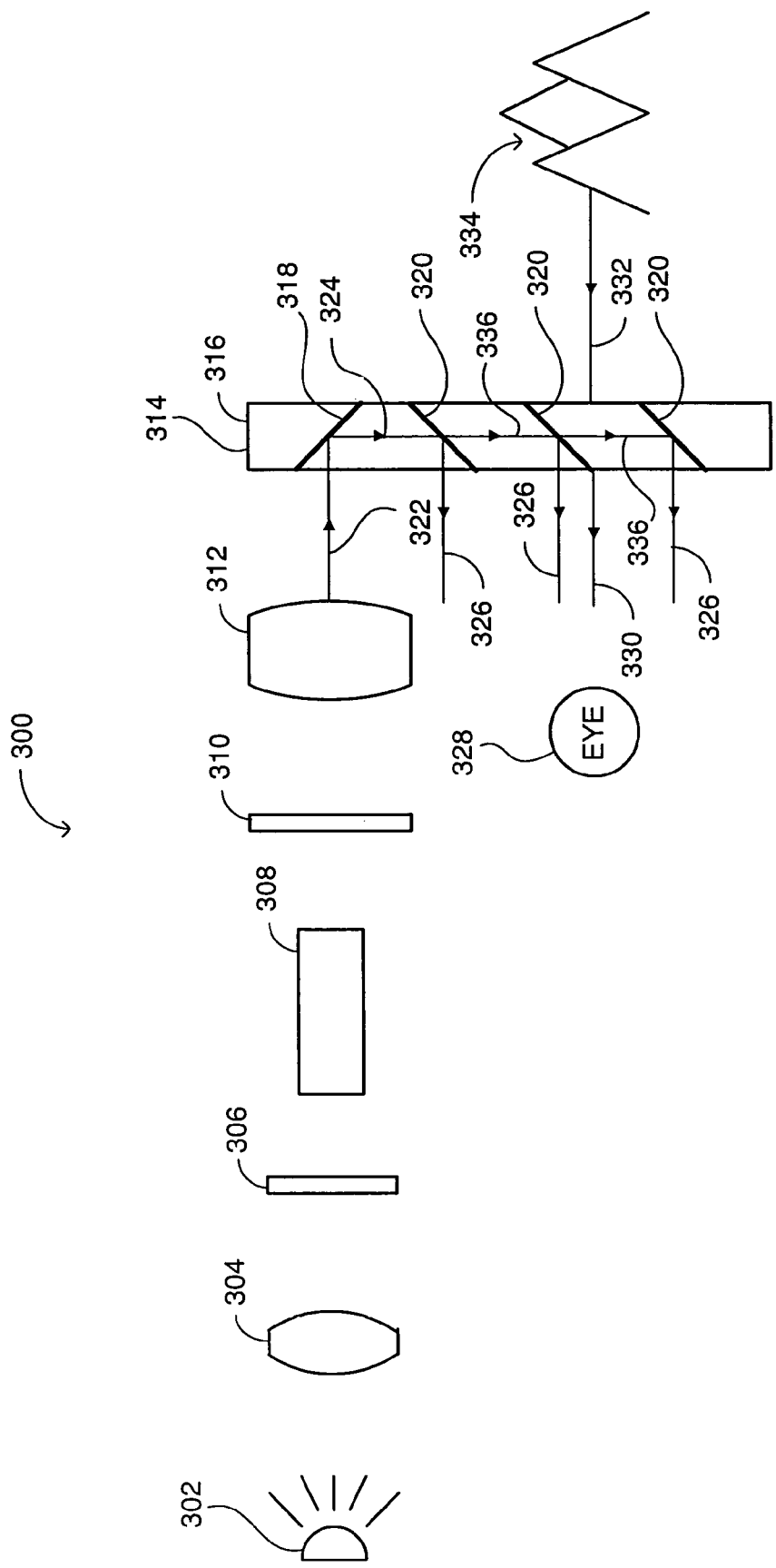
FIG. 4 is a schematic illustration of a block diagram of the system of FIG. 3.

Reference is now made to FIGS. 3 and 4. FIG. 3 is a schematic illustration in perspective, of a system generally referenced 300, for providing an observer an informative image along with a scene image of a scene, having an enlarged eye motion box, constructed and operative according to another embodiment of the disclosed technique, wherein the observer is located on the same side of a planar light guide of the system where an image source of the system is located. FIG. 4 is a schematic illustration of a block diagram of the system of FIG. 3.

System 300 includes a light source 302, backlight optics 304, an image source 306, an optical relay 308, a diffuser 310, a horizontally expanding optical assembly 312, and a planar optical module 314. Planar optical module 314 includes a planar light guide 316, a reflector 318, and a plurality of beam splitters 320. Backlight optics 304 is located between light source 302 and image source 306. Optical relay 308 is located between image source 306 and diffuser 310. Horizontally expanding optical assembly 312 is located between diffuser 310 and planar optical module 314.

Light source 302, backlight optics 304, image source 306, optical relay 308, diffuser 310, and horizontally expanding optical assembly 312, are similar to light source 102, backlight optics 104, image source 106, optical relay 108, diffuser 110, and horizontally expanding optical assembly 112, respectively, as described herein above in connection with FIG. 1. Planar optical module 314 is similar to planar optical module 114, except that each of beam splitters 320 is located at an angle relative to a light beam 322, arriving from horizontally expanding optical assembly 312, such that it reflects a portion of a reflected light beam 324, as a light beam 326, reflected by reflector 318, toward an eye 328 of the observer, who is located on the same side of planar optical module 314 that image source 306 is located. Each of beam splitters 320 further directs another portion of reflected light beam 324, as a light beam 336 toward the consecutive beam splitter. In this manner planar optical module 314 vertically expands light beam 322, thereby producing a substantially large wide angle image, of a substantially narrow angle small image, produced by image source 306. Planar optical module 314 produces a combined light beam 330 by combining light beams 326, with a light beam 332 arriving at planar optical module 314, from a scene 334, located on a side of planar optical module 314 opposite that of image 306.

It will be appreciated by persons skilled in the art that the disclosed technique is not limited to what has been particularly shown and described hereinabove. Rather the scope of the disclosed technique is defined only by the claims, which follow.

The invention claimed is:

1. Head up display (HUD) for displaying a combined image of, a scene image of a scene and an informative image, for an observer, the HUD comprising:
    an image source for producing a substantially small narrow angle informative image, said informative image including information for presentation to said observer;
    an optical relay for producing a substantially large narrow angle informative image, by enlarging said substantially small narrow angle informative image, received from said image source;
    a horizontally expanding optical assembly for producing a horizontally magnified image, by horizontally magnifying said substantially large narrow angle informative image, received from said optical relay, said horizontally expanding optical assembly being of low physical height; and
    a planar optical module including:
        a planar light guide;
        a reflector for directing said horizontally expanded image into said planar light guide as a reflected light beam; and
        a plurality of beam splitters, each of said beam splitters directing a respective portion of said reflected light beam toward said observer in a direction substantially normal to said planar optical module, wherein each of said respective portion of said reflected light beam including all said information of said informative image to be presented to said observer, each of said beam splitters directing another respective portion of said reflected light beam toward a consecutive one of said beam splitters, each of said beam splitters producing said combined image by combining said scene image with said respective portion of said reflected light beam.

2. The HUD according to claim 1, further comprising a diffuser optically coupled after said optical relay and before said horizontally expanding optical assembly for producing a substantially wide angle image, by diffusing said substantially large narrow angle image, received from said optical relay.

3. The HUD according to claim 1, wherein said planar optical module directs said combined image toward an eye of said observer, located on a side of said planar optical module, opposite that of said image source.

4. The HUD according to claim 1, wherein said planar optical module directs said combined image toward an eye of said observer, located on the same side of said planar optical module, as that of said image source.

5. The HUD according to claim 1, further comprising a light source, for producing a point like source of light, for illuminating said substantially small narrow angle informative image.

6. The HUD according to claim 5, further comprising a backlight optics, for homogenizing said point-like source of light emitted by said light source and for producing a uniform beam of light.

7. The HUD according to claim 5, wherein said light source is a light emitting diode (LED).

8. The HUD according to claim 5, wherein said light source is a laser.

9. The HUD according to claim 5, wherein said light source has a substantially small physical size.

10. The HUD according to claim 6, wherein said backlight optics is an optical device selected from the list consisting of:
    a fiber optic light guide;
    a light guide filled with a light transmitting fluid;
    a fly eyes homogenizer; and
    a set of one or more lenses.

11. The HUD according to claim 1, wherein said image source is selected from the list consisting of:
    a two dimensional LCD;
    a cathode ray tube (CRT);
    a digital matrix display micromirror device (DMD); and
    a liquid crystal on silicon (LCOS).

12. The HUD according to claim 1, wherein said low physical height horizontally expanding optical assembly is in the form of a portion of an equiconvex lens.

13. The HUD according to claim 1, wherein said reflector is oriented at an angle relative to the direction of said horizontally expanded image.

14. The HUD according to claim 1, wherein each of said plurality of beam splitters is oriented at an angle relative to the direction of said horizontally expanded image, such that said respective portion of said reflected light beam is directed away from said image source and toward said observer, wherein said observer is located on an opposite side of said image source.

15. The HUD according to claim 1, wherein each of said plurality of beam splitters is oriented at an angle relative to the direction of said horizontally expanded image, such that said respective portion of said reflected light beam is directed away from said image source and toward said observer, wherein said observer is located on the same side of said image source.

16. The HUD according to claim 1, wherein said horizontally expanding optical assembly is of a lower physical height which is substantially smaller than the physical width of said horizontally expanding optical assembly and smaller than the height of the planer optical.

17. The HUD according to claim 1, wherein said substantially large narrow angle informative image produced by said optical replay is substantially large comparing to said substantially small narrow angle informative image received from said image source.

* * * * *